(12) United States Patent
Shiozaki et al.

(10) Patent No.: US 7,588,132 B2
(45) Date of Patent: Sep. 15, 2009

(54) EXTERNAL CONTROL TYPE FAN-COUPLING DEVICE

(75) Inventors: Ken Shiozaki, Susono (JP); Shigeyuki Serizawa, Gotenba (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 12/054,760

(22) Filed: Mar. 25, 2008

(65) Prior Publication Data

US 2008/0173514 A1   Jul. 24, 2008

Related U.S. Application Data

(62) Division of application No. 11/269,375, filed on Nov. 8, 2005, now Pat. No. 7,367,438.

(30) Foreign Application Priority Data

Nov. 9, 2004 (JP) ............................. 2004-325664
Oct. 17, 2005 (JP) ............................. 2005-301578

(51) Int. Cl.
*F16D 31/00* (2006.01)
(52) U.S. Cl. .................................... 192/58.61
(58) Field of Classification Search ............... 192/58.61
See application file for complete search history.

(56) References Cited

U.S. PATENT DOCUMENTS

| 2,879,755 A | 3/1959 | Weir |
| 2,988,188 A | 6/1961 | Tauschek |
| 3,059,745 A | 10/1962 | Tauschek |
| 3,217,809 A | 11/1965 | Weir |
| 3,259,221 A | 7/1966 | Godfrey |
| 3,272,188 A | 9/1966 | Sabat |
| 3,430,743 A | 3/1969 | Fuita et al. |
| 3,463,282 A | 8/1969 | Fujita et al. |
| 3,642,105 A | 2/1972 | Kikuchi |
| 3,727,354 A | 4/1973 | La Flame |
| 3,840,101 A | 10/1974 | Peter et al. |
| 3,856,122 A | 12/1974 | Leichliter |
| 3,893,555 A | 7/1975 | Eleller |
| 3,964,582 A | 6/1976 | Mitchell |
| 4,238,016 A | 12/1980 | Yoshida et al. |
| 4,281,750 A | 8/1981 | Clancey |
| 4,305,491 A * | 12/1981 | Rohrer ............. 192/58.61 |
| 4,355,709 A * | 10/1982 | Light ............... 192/58.61 |
| 4,403,684 A | 9/1983 | Haeck |
| 4,505,367 A | 3/1985 | Martin |
| 4,591,037 A | 5/1986 | Bopp |

(Continued)

FOREIGN PATENT DOCUMENTS

DE   39 41 610 A1   6/1991

(Continued)

*Primary Examiner*—Sherry Estremsky
(74) *Attorney, Agent, or Firm*—Gerald E. Hespos; Anthony J. Casella

(57) ABSTRACT

An external-control-type fan coupling device is provided and has no restriction on the layout or positional relationship of an electromagnetic coil and a valve element of the device. As a result, the casing and the valve structure of the device can be simplified. Additionally, the design prevents leaking of oil and leaking of magnetism without adversely affecting performance.

4 Claims, 7 Drawing Sheets

U.S. PATENT DOCUMENTS

| | | | | |
|---|---|---|---|---|
| 4,629,046 | A | 12/1986 | Martin | |
| 4,633,994 | A * | 1/1987 | Light | 192/58.61 |
| 4,665,694 | A | 5/1987 | Brunken | |
| 4,667,791 | A | 5/1987 | Martin et al. | |
| 4,685,549 | A | 8/1987 | Brunken et al. | |
| 4,699,258 | A | 10/1987 | Johnston et al. | |
| 4,796,571 | A | 1/1989 | Ono et al. | |
| 4,846,331 | A | 7/1989 | Ono | |
| 4,850,465 | A | 7/1989 | Ono | |
| 4,903,643 | A | 2/1990 | Takikawa et al. | |
| 4,930,458 | A | 6/1990 | Takikawa et al. | |
| 5,004,085 | A | 4/1991 | Taureg | |
| 5,018,612 | A | 5/1991 | Takikawa et al. | |
| 5,025,906 | A | 6/1991 | O'Neil et al. | |
| 5,030,865 | A | 7/1991 | Rockey et al. | |
| 5,060,774 | A | 10/1991 | Takikawa et al. | |
| 5,090,533 | A | 2/1992 | Inoue | |
| 5,101,949 | A | 4/1992 | Takikawa et al. | |
| 5,109,965 | A | 5/1992 | Inoue | |
| 5,119,920 | A | 6/1992 | Inoue | |
| 5,125,491 | A | 6/1992 | Takikawa et al. | |
| 5,139,125 | A | 8/1992 | Takikawa et al. | |
| 5,232,074 | A | 8/1993 | Watanabe | |
| 5,452,782 | A | 9/1995 | Inoue | |
| 5,501,183 | A | 3/1996 | Takayama | |
| 5,575,368 | A | 11/1996 | Kikuchi et al. | |
| 5,722,523 | A | 3/1998 | Martin | |
| 5,794,749 | A | 8/1998 | Ryuu | |
| 5,816,376 | A | 10/1998 | Hatori | |
| 5,881,857 | A | 3/1999 | Ryuu | |
| 5,893,442 | A * | 4/1999 | Light | 192/58.61 |
| 6,026,943 | A * | 2/2000 | Fuchs et al. | 192/58.61 |
| 6,032,775 | A * | 3/2000 | Martin | 192/58.61 |
| 6,125,981 | A | 10/2000 | Ito et al. | |
| 6,208,049 | B1 | 3/2001 | Rennefeld et al. | |
| 6,247,567 | B1 | 6/2001 | Watanabe | |
| 6,443,283 | B1 | 9/2002 | Augenstein et al. | |
| 6,530,462 | B2 | 3/2003 | Lutz | |
| 6,550,596 | B2 | 4/2003 | Shiozaki et al. | |
| 6,634,476 | B2 | 10/2003 | Inoue et al. | |
| 6,695,113 | B2 | 2/2004 | Lutz | |
| 6,732,845 | B2 * | 5/2004 | Tilly et al. | 192/58.61 |
| 6,752,251 | B2 * | 6/2004 | May et al. | 192/58.61 |
| 6,807,926 | B2 | 10/2004 | Shiozaki et al. | |
| 6,811,009 | B2 | 11/2004 | Inoue et al. | |
| 6,915,888 | B2 | 7/2005 | Shiozaki et al. | |
| 6,935,478 | B2 * | 8/2005 | Drager et al. | 192/58.61 |
| 7,047,911 | B2 | 5/2006 | Robb et al. | |
| 7,159,702 | B2 * | 1/2007 | Tilly | 192/58.61 |
| 7,293,636 | B2 * | 11/2007 | May | 192/58.61 |
| 7,318,510 | B2 * | 1/2008 | Heinle et al. | 192/58.61 |
| 2006/0096830 | A1 | 5/2006 | Shiozaki et al. | |
| 2007/0205071 | A1 * | 9/2007 | Light | 192/58.61 |

FOREIGN PATENT DOCUMENTS

| | | |
|---|---|---|
| JP | 54-25581 | 8/1979 |
| JP | 55-76226 | 6/1980 |
| JP | 57-1829 | 1/1982 |
| JP | 57-167533 | 10/1982 |
| JP | 57-179431 | 11/1982 |
| JP | 59-27452 | 7/1984 |
| JP | 62-124330 | 6/1987 |
| JP | 62-194038 | 8/1987 |
| JP | 63-182332 | 11/1988 |

* cited by examiner

FIG.7A  FIG.7B  FIG.7C
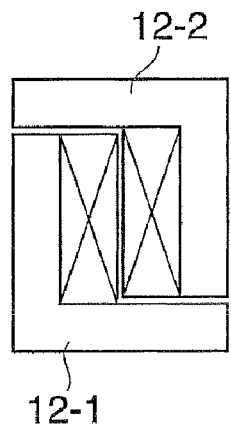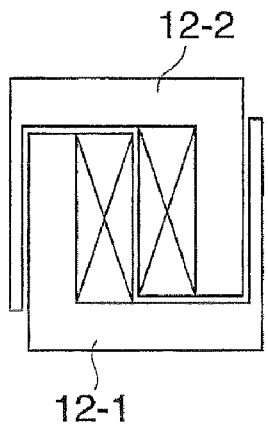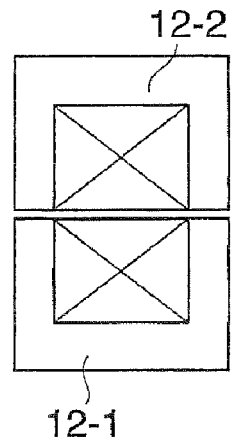
FIG.7D  FIG.7E  FIG.7F
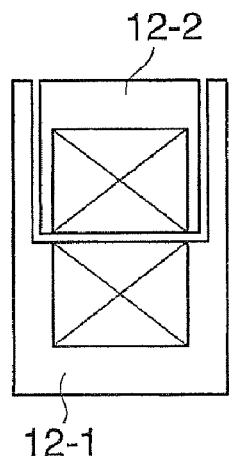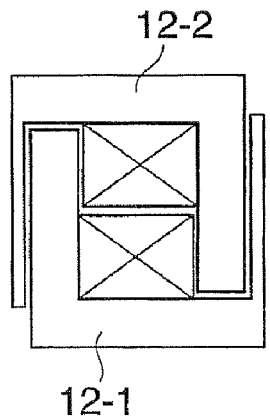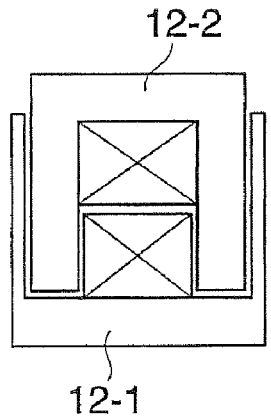

EXTERNAL CONTROL TYPE FAN-COUPLING DEVICE

This application is a divisional of application Ser. No. 11/269,375 filed on Nov. 8, 2005, now U.S. Pat. No. 7,367,438.

BACKGROUND OF THE INVENTION

1. Field of the Invention

The present invention relates to, in general, an external-control-type fan coupling device adopting a method which controls the rotation of a fan for cooling an engine in an automobile or the like in accordance with a temperature change of an external surrounding or a rotation change.

2. Description of the Related Art

Conventionally, as a fan coupling device of this type, there has been known a fan coupling device which is configured such that an inside of a hermetic housing which is formed of a non-magnetic casing and a cover which is mounted on the casing is supported on a rotary shaft body (a drive shaft) which mounts a drive disc on a distal end thereof by way of a bearing is divided into an oil reservoir chamber and a torque transmission chamber which houses the drive disc therein by a partition plate having an oil supply adjustment hole, and a valve element having magnetic property which opens or closes an oil circulation flow passage which is formed between the torque transmission chamber and the oil reservoir chamber is provided in the inside of the oil reservoir chafer, and an open/close control of the oil circulation flow passage is performed by operating the valve element using an actuator, wherein the rotational torque transmission from a drive side to a driven side is controlled by increasing or decreasing an effective contact area of oil in a torque transmission gap portion defined between the drive side and the driven side.

As this type of external-control-type fan coupling device, there has been known an external-control-type fan coupling device of a system which controls the rotation of a fan from the outside by operating an actuator inside the coupling device by exciting an electromagnetic coil fixed to an engine or vehicle body side. The structure forms a magnetic loop in which a magnetic flux generated by the excitation of the electromagnetic coil is transmitted to the valve element through a magnetic path of a magnetic body (shaft, valve element) having the high permeability, and the magnetic flux is again made to return to the electromagnetic coil, wherein a voltage is applied to the electromagnetic coil in response to an input signal from an ECU, and the valve element in the inside of the coupling device is opened or closed by a generated electromagnetic force thus controlling a flow rate of the torque transmission oil (see U.S. Pat. No. 6,443,283).

However, the above-mentioned conventional external-control-type fan coupling device has following drawbacks.

That is, in the method which operates the fan coupling device by transmitting the magnetic flux which excites the externally fixed electromagnetic coil to the valve element in the inside of the coupling device, it is necessary to form the magnetic loop in which the magnetic flux generated by the excitation of the electromagnetic coil is transmitted to the valve element through the magnetic path of a magnetic body (shaft, valve element) having the high permeability, and the magnetic flux is again made to return to the electromagnetic coil. Accordingly the conventional fan coupling device has a drawback that there exists the restriction on a layout with respect to a positional relationship of the electromagnetic coil and the valve element, a drawback that the casing and the valve structure become complicated, a drawback that there exists a possibility of leaking of oil in incorporating the magnetic parts for constituting the magnetic loop into the inside of the coupling device, a drawback that leaking of magnetism is increased due to the elongated magnetic circuit, a drawback that the general-purpose property of the system to fan coupling devices which differ in size is insufficient and the like.

SUMMARY OF THE INVENTION

The present invention has been made to overcome the above-mentioned drawbacks of the conventional external-control-type fan coupling device, and it is an object of the present invention to provide an external-control-type fan coupling device which receives no restriction on the layout with respect to the positional relationship of an electromagnetic coil and a valve element, achieves the simplification of the casing and the valve structure, the miniaturization and the reduction of weight of the device, and the prevention of the leaking of oil and the leaking of magnetism, and exhibits the sufficient system general-purpose property.

An external-control-type fan coupling device according to the present invention adopts a method in which a power generating part which supplies an electric current by making use of the rotation of a drive shaft (a rotating shaft body) is incorporated in the coupling device so as to drive an actuator which operates a valve element, wherein the gist of the present invention lies in that the fan coupling device is configured such that an inside of a hermetic housing which is formed of a non-magnetic casing which is supported on a rotary shaft body which mounts a drive disc on a distal end thereof by way of a bearing and a cover which is mounted on the casing is divided into an oil reservoir chamber and a torque transmission chamber which houses the drive disc therein by a partition plate which is mounted on the cover, the coupling device includes an oil circulation flow passage which is formed between the torque transmission chamber and the oil reservoir chamber and an oil supply adjustment hole which is formed in the partition plate, the coupling device includes a valve element which opens or closes the oil supply adjustment hole in the oil reservoir chamber, and an open/close control of the oil circulation flow passage is performed by operating the valve element using an actuator, and the rotational torque transmission from a drive side to a driven side is controlled by increasing or decreasing an effective contact area of oil in a torque transmission gap portion defined between the drive side and the driven side, wherein the actuator is mounted on the cover of the hermetic housing, the coupling device includes a primary coil which is fixed to the outside and a secondary coil which is fixed to the hermetic housing and faces the primary coil in an opposed manner, and the actuator which is mounted on the cover of the hermetic housing is driven by an electric current induced to the secondary coil.

Here, in the case of the external-control-type fan coupling device, a valve element open/close mechanism may be constituted by miniaturizing the actuator which operates the valve element and by mounting the miniaturized actuator on the cover of the hermetic housing in a state that the actuator is offset from the rotary shaft body.

Another external-control-type fan coupling device according to the present invention is configured such that an inside of a hermetic housing which is formed of a non-magnetic casing which is supported on a rotary shaft body which mounts a drive disc on a distal end thereof by way of a bearing and a cover which is mounted on the casing is divided into an oil reservoir chamber and a torque transmission chamber which houses the drive disc therein by a partition plate which is fixedly mounted on the drive disc, the coupling device includes an oil circulation flow passage which is formed between the torque transmission chamber and the oil reservoir chamber and an oil supply adjustment hole which is formed in the partition plate, the coupling device includes a valve element which opens or closes the oil supply adjustment hole in the oil reservoir chamber, and an open/close control of the oil circulation flow passage is performed by operating the valve element using an actuator, and the rotational torque transmission from a drive side to a driven side is controlled by increasing or decreasing an effective contact area of oil in a torque transmission gap portion defined between, the drive side and the driven side, wherein the coupling device adopts a method in which the actuator is arranged in the inside of the rotary shaft body, a control rod which is operated by the actuator penetrates the inside of the rotary shaft body in the axial direction so as to control the valve element, the coupling device includes a primary coil which is fixed to the outside and a secondary coil which is fixed to the rotary shaft body and faces the primary coil in an opposed manner, and the actuator which is mounted in the rotary shaft body is driven by an electric current induced to the secondary coil.

Further, the coupling device of the present invention may adopt a method which rectifies an AC current induced to the secondary coil into a DC current and drives the actuator using the DC current, while either one of a rotary-type solenoid type actuator or a linear-type solenoid type actuator may be used as the actuator.

The external-control-type fan coupling device of the present invention adopts the method in which the electricity is supplied to the rotating coupling device body in a non-contact manner and the actuator for operating the valve element is driven by the electricity and hence, it is no more necessary to constitute a complicated magnetic circuit (a magnetic loop) adopted by the conventional structure thus simplifying the structure, the leaking of oil is substantially eliminated, and the leaking of magnetism is made extremely small. Further, since the power supply part (transformer part) and the actuator are electrically connected with each other by a lead line, the restriction on the layout with respect to the positional relationship of power supply part and the actuator is extremely small. Further, since the restriction on-size of the actuator portion is small, the general-purpose property is also enhanced. Still further, even when the external-control-type fan coupling device is a large-diameter external-control-type fan coupling device to drive a large-diameter fan for a large-sized vehicle and the position of the oil supply adjustment hole becomes remote from the center of rotation of the coupling device, it is unnecessary to increase a diameter of coils and the coupling device can be operated with the small-diameter coil whereby the coupling device becomes miniaturized and light-weighted thus giving rise to an advantageous effect that the layout property is also enhanced.

BRIEF DESCRIPTION OF THE DRAWINGS

FIG. 7 is a schematic view showing layout examples of a primary coil and a secondary coil in the external-control-type fan coupling device of the present invention, wherein A and B show the external-control-type fan coupling device of a lateral type and C to F show the external-control-type fan coupling device of a vertical type.

DESCRIPTION OF THE PREFERRED EMBODIMENTS

Figure 1:
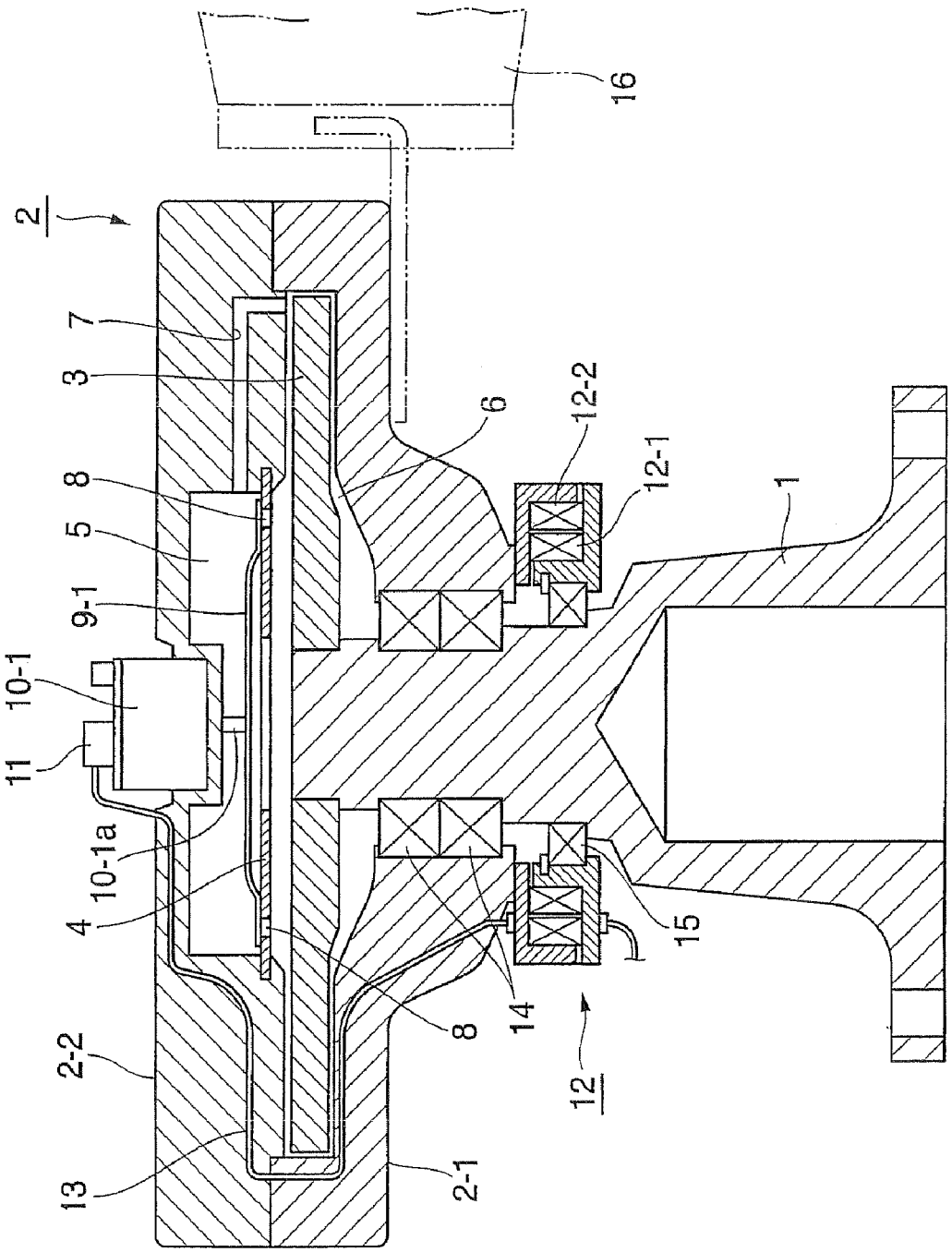
FIG. 1 is a longitudinal cross-sectional view showing the first embodiment of an external-control-type fan coupling device according to the present invention.
Figure 2:
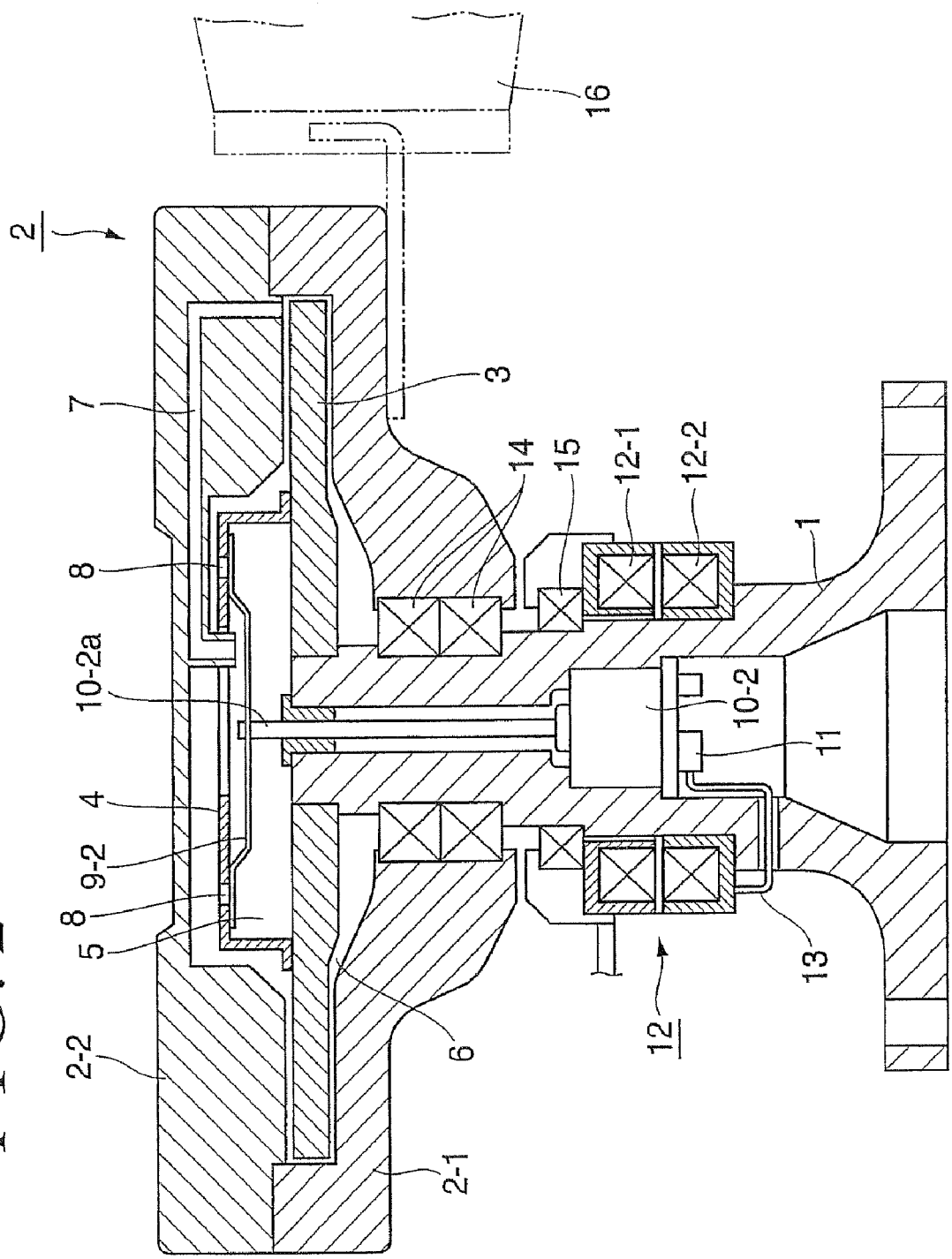
FIG. 2 is a longitudinal cross-sectional view showing the second embodiment of an external-control-type fan coupling device according to the present invention.

FIG. 1 to FIG. 6 show an example of an external-control-type fan coupling device according to the present invention, wherein FIG. 1 and FIG. 2 are longitudinal cross-sectional views showing an external-control-type fan coupling device which adopts a rotary type solenoid type as an actuator, while FIG. 3 to FIG. 6 are longitudinal cross-sectional views showing an external-control-type fan coupling device which adopts a linear solenoid type as an actuator, and FIG. 7 is a schematic view shoving layout examples of a primary coil and a secondary coil in the fan coupling device according to the present invention. In the drawing, numeral 1 indicates a rotary shaft body (drive shaft), numeral 2 indicates a hermetic housing, numeral 2-1 indicates a casing, numeral 2-2 indicates a cover, numeral 3 indicates a drive disc, numeral 4 indicates a partition plate, numeral 5 indicates an oil reservoir chamber, numeral 6 indicates a torque transmission chamber, numeral 7 indicates an oil recovery-circulation flow passage, numeral 8 indicates an oil supply adjustment hole, numerals 9-1 to 9-6 indicate oil-supply valve elements numerals 10-1, 10-2 indicates a rotary-type solenoid-type actuator, numerals 10-3 to 10-6 indicate a linear solenoid-type actuator, numeral 11 indicates a rectifier, numeral 12 indicates a power source supply transformer, numeral 12-1 indicates a primary coil (electromagnetic coil), numeral 12-2 indicates a secondary coil (electromagnetic coil), numeral 13 indicates a lead line, numeral 14 indicates a hermetic housing bearing, numeral 15 indicates a primary-coil bearing, and numeral 16 indicates a fan.

That is, in the external-control-type fan coupling device shown in FIG. 1, on the rotary shaft body (the drive shaft) 1 which is rotated by driving of a drive part (engine), the hermetic housing 2 which is formed of the casing 2-1 and the cover 2-2 is supported by way of the hermetic housing bearing 14. The inside of the hermetic housing 2 is divided into the oil reservoir chamber 5 and the torque transmission chamber 6 by the partition plate 4 provided with the oil supply adjustment hole 8. In the inside of the torque transmission chamber 6, the drive disc 3 which is fixedly mounted on a distal end of the rotary shaft body 1 is housed in a state that a torque transmission gap is formed between the drive disc 3 and an inner peripheral surface of the torque transmission chamber.

The oil-supply valve element 9-1 which opens or closes the oil supply adjustment hole 8 through which the oil recovered by the oil recovering circulation communication passage 7 formed in the cover 2-2 flows out to the torque transmission chamber 6 is mounted on a control rod 10-1a of the rotary-type solenoid-type actuator 10-1 mounted on a front surface of the cover 2-2. Due to such a constitution, the oil-supply valve element 9-1 is tilted above the partition plate 4 due to the rotation of the control rod 10-1*a* so as to open or close the oil-supply adjustment hole 8. Here, when the linear solenoid type actuator is used, the oil supply adjustment hole 8 is opened or closed due to the frontward and backward movement of the control rod 10-1*a*.

The power source supply transformer 12 is constituted of the primary coil 12-1 which is fixed to the engine or the vehicle body side and a secondary coil 12-2 which is fixed to the casing 2-1 of the coupling device. To explain an operational principle of the power source supply transformer 12, when an AC voltage (a sinusoidal wave or a square wave) is applied to the primary coil 12-1, due to an electric current which flows in the primary coil 12-1, a magnetic flux is generated in a primary coil core due to the Ampere's right-handed screw law, the magnetic flux flows into the rotating secondary coil core, and again returns to the primary coil core thus forming a magnetic loop. Hare, a vector of the magnetic flux which flows in the secondary coil core has the direction thereof changed in synchronism, with an AC frequency applied to the primary coil 12-1. Further, due to an electro-magnetic induction action of the magnetic flux (magnetic field) which flows in the secondary coil core, an electric current is induced in the secondary coil 12-2, this AC current flows into the actuator 10-1 side through a lead line 13 which is wired in the inside of the hermetic housing 2, the AC current is rectified into a DC current by the rectifier 11 which is attached to the actuator 10-1, and the DC current is used as a driving power of the actuator so as to operate the oil-supply valve element 9-1. Here, when an AC actuator is used, the rectifier 11 is not necessary.

The external-control-type fan coupling device shown in FIG. 2 adopts a system in which the rotary-type solenoid-type actuator 10-2 and the rectifier 11 are arranged in the inside of the rotary shaft body (drive shaft) 1, and the control rod 10-2*a* of the actuator 10-2 penetrates the rotary shaft body 1 in the axial direction 30 as to operate the oil-supply valve element 9-2. To explain the structure of the system, the inside of the hermetic housing 2 which is constituted of the casing 2-1 which is supported on the rotary shaft body (drive shaft) 1 which fixedly mounts the drive disc 3 on a distal end thereof by way of the hermetic housing bearing 14 and the cover 2-2 is divided into the oil reservoir chamber 5 and the torque transmission camber 6 which arranges the drive disc therein by the partition plate 4 having the oil supply adjustment hole 8 which is fixedly mounted on the drive disc 3, and in the inside of the torque transmission chamber 6, the drive disc 3 which is fixedly mounted on the distal end of the rotary shaft body 1 is housed in a state that a torque transmission gap is formed between the drive disc 3 and an inner peripheral surface of the torque transmission chamber 6. Further, the control rod 10-2*a* of the rotary solenoid-type actuator 10-2 which is arranged in the inside of the rotary shaft body (drive shaft) 1 axially penetrates the rotary shaft body 1 and projects into the inside of the oil reservoir chamber 5, the oil-supply valve element 9-2 which opens or closes the oil supply adjustment hole 8 formed in the partition plate 4 which is fixedly mounted on the drive disc 3 is fixedly mounted on the distal end of the control rod 10-2*a*, To explain the manner of operation of this fan coupling device, in the same manner as the fan coupling device shown in FIG. 1, due to the rotation of the control rod 10-2*a* of the actuator 10-2, the oil-supply valve element 9-2 is tilted on the partition plate 4 so as to open or close the oil supply adjustment hole 8. Further, in the case of this fan coupling device, the secondary coil 12-2 of the power source supply transformer 12 is fixed to the rotary shaft body (drive shaft) 1. Further, in case of this fan coupling device, the secondary coil 12-2 of the power source supply transformer 12 is fixed to the rotary shaft body (drive shaft) 1. Here, also in the case of this fan coupling device, when the linear solenoid type actuator is used, the oil supply adjustment hole 8 is opened or closed due to the forward and backward movement of the control rod 10-2*a*.

As shown in FIG. 2, when the external-control-type fan coupling device adepts the system in which the rotary-type solenoid type actuator 10-2 and the rectifier 11 are arranged in the inside of the rotary shaft body (drive shaft) 1 and the control rod 10-2*a* of the actuator 10 penetrates the rotary shaft body 1 in the axial direction and operates the oil-supply valve element 9-2, it is possible to form the oil reservoir chamber 5 in the inside of the partition plate 4 of the drive disc 3 which is rotated at a speed higher than a speed of the hermetic housing 2 and hence, it is possible to supply the oil by making use of a large centrifugal which is generated by the high-speed rotation of the rotary shaft body (drive shaft) 1 whereby the oil supply ability is enhanced thus also enhancing a fan rotation response. Further, since the actuator which has a large weight is not arranged on the cover side, a moment weight is decreased. Accordingly, compared to the external-control-type fan coupling device shown in FIG. 1 adopting the system which fixes the actuator to the cover 2-2, it is possible to reduce a load of the bearing 14 which supports the follower portion (the hermetic housing 2 constituted of the casing 2-1 and the cover 2-2) and a load of a bearing (not shown in the drawing) of an engine-side drive shaft (not shown in the driving) which drives the rotary shaft body 1 thus enhancing the durability of the bearings and also enhancing the reliability of the whole cooling system of the engine.

Further, in the system which fixes the secondary coil 12-2 of the power source supply transformer 12 to the rotary shaft body (drive shaft) 1, compared to the external-control-type fan coupling device shown in FIG. 1 which adopts the system in which the secondary coil 12-2 is fixed to the casing 2-1, in the same manner as the above-mentioned case, it is possible to reduce the weight of the follower portion (the hermetic housing 2 formed of the casing 2-1 and the cover 2-2) and hence, it is possible not only to reduce the load of the bearing 14 which supports the follower portion but also to shift the position of center of gravity of the fan coupling device to the engine side thus bringing about advantages such as the reduction of the moment load on the rotary shaft body (drive shaft) 1 and the lowering of the elevation of the electric resistance attributed to the heat generation of the fan coupling device which is caused by the shortening of the distance of the lead line 13 from, the secondary coil 12-2 to the actuator 10-2.

Figure 3:
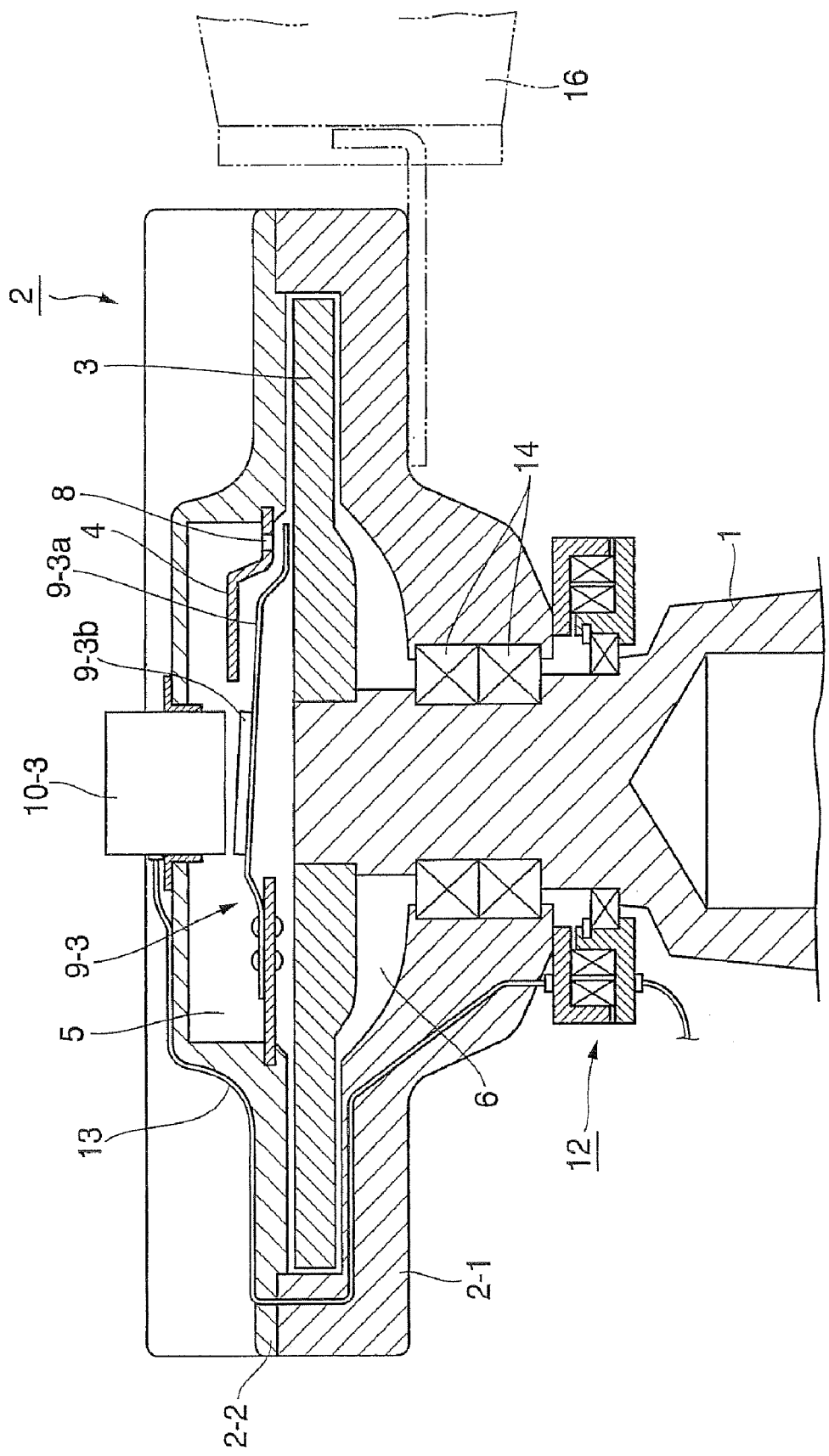
FIG. 3 is a longitudinal cross-sectional view showing the third embodiment of an external-control-type fan coupling device according to the present invention.

The external-control-type fan coupling device shown in FIG. 3 adopts a system in which the linear solenoid type actuator 10-3 is adopted in place of the rotary-type solenoid-type actuator 10-1 in the external-control-type fan coupling device shown in the above-mentioned FIG. 1, and the oil supply valve element 9-3 which is formed of a leaf spring 9-3*a* and an armature 9-3*b* is used in place of the oil supply valve element 9-1, wherein a drive electricity of the linear solenoid type actuator 10-3 is supplied from the power source supply transformer 12 through the lead line 13.

That is, in the external-control-type fan coupling device which adopts the linear solenoid type actuator 10-3, a proximal end portion of the leaf spring 9-3*a* is mounted on the partition plate 1 in a state that the armature 9-3*b* of the oil-supply valve element 9-3 which is formed of the leaf spring 9-3*a* and the armature 9-3*b* is positioned in the vicinity of the driving portion of the actuator 10-3.

In the external-control-type fan coupling device having the above-mentioned constitution, when the linear solenoid-type actuator 10-3 is turned OFF, the armature 9-3b of the oil-supply valve element 9-3 is spaced apart from the actuator 10-3 due to an action of the leaf spring 9-3a thus opening the oil-supply adjustment hole B formed in the partition plate 4 and the oil is supplied to the torque transmission chamber 5, while when the actuator 10-3 is turned ON, the armature 9-3b is sucked to the actuator 10-3 side and hence, the leaf spring 9-3a is brought into pressure contact with the partition plate 4 whereby the oil supply adjustment hole 3 is closed and the supply of the oil to the torque transmission chamber 5 is stopped.

In case of the external-control-type fan coupling device shown in the above-mentioned FIG. 3, by adopting the linear solenoid-type actuator 10-3 having no operating shaft, it is possible to enhance not only the fan rotation response but also the durability of the actuator 10-3 and the oil-supply valve element 9-3 and the reliability of the whole cooling system of the engine. Further, it is possible to completely eliminate the possibility of leaking of oil.

Figure 4:
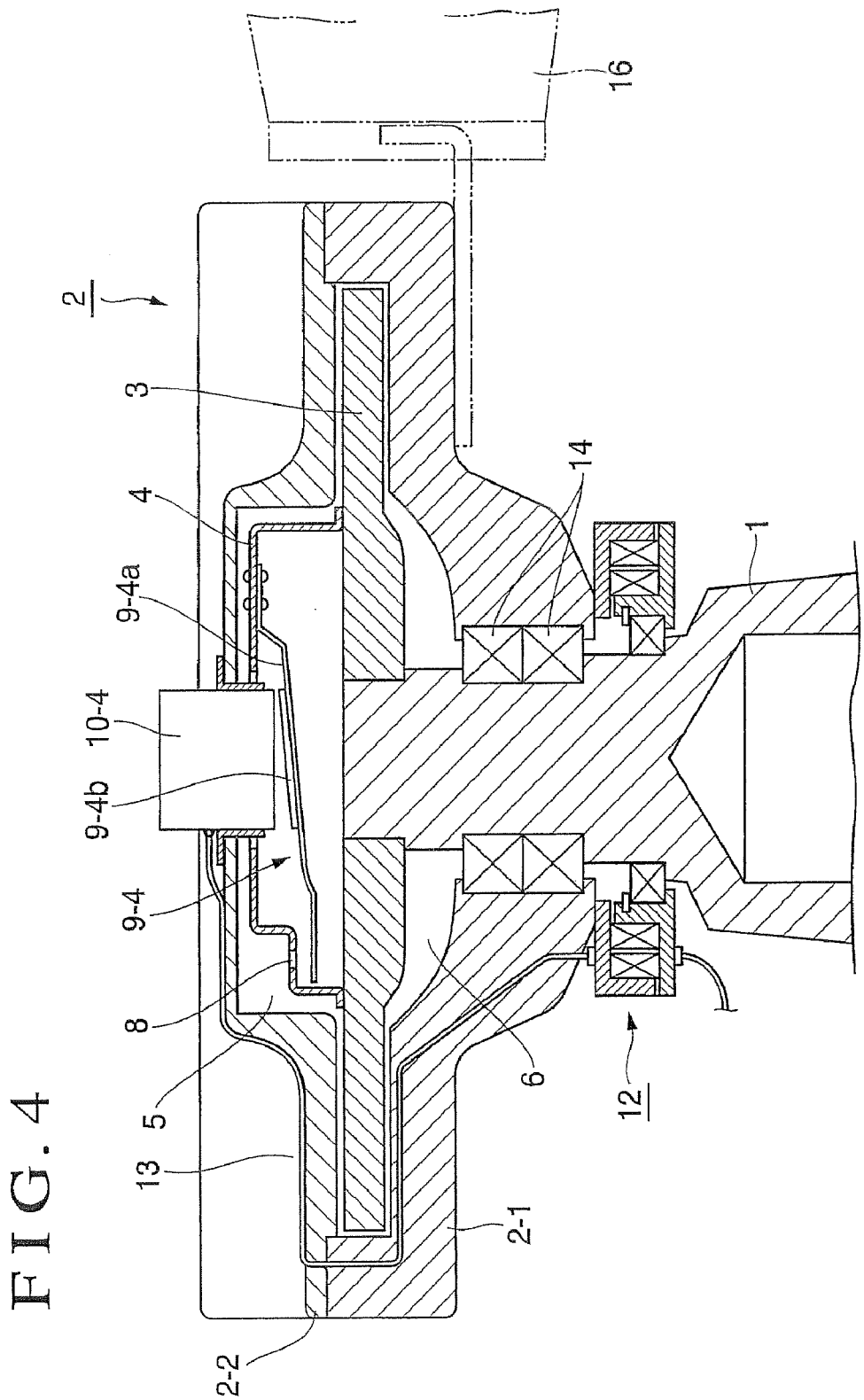
FIG. 4 is a longitudinal cross-sectional view showing the fourth embodiment of an external-control-type fan coupling device according to the present invention.

The external-control-type fan coupling device shown in FIG. 4 relates to a case in which the present invention is applied to an external-control-type fan coupling device in which the partition plate 4 having the oil supply adjustment hole 3 is fixedly mounted on the drive disc 3 and the fan coupling device adopts a system which supplies electricity to the linear-solenoid-type actuator 10-4 and is equal to the system shown in FIG. 1. An operation mechanism of the oil-supply valve element is, in the same manner as the operation mechanism of the oil-supply valve element shown in FIG. 3, configured such that, in place of the oil-supply valve element 9-1 of the external-control-type fan coupling device shown in FIG. 1, the fan coupling device uses the oil-supply valve element 9-4 which is formed of a leaf spring 9-4a and an armature 9-4b, and a proximal end portion of the leaf spring 9-4a is mounted on the partition plate 4 which is fixedly mounted on the drive disc 3 in a state that the armature 9-4b of the oil-supply valve element 9-4 is positioned in the vicinity of a drive portion of the actuator 10-4 mounted on the cover 2-2 of the hermetic housing 2.

In case of the external-control-type fan coupling device which adopts the linear solenoid-type actuator 10-4, when the actuator 10-4 is turned OFF, the armature 9-4b of the oil-supply valve element 9-4 is spaced apart from the actuator 10-4 due to an action of the leaf spring 9-4a thus opening the oil-supply adjustment hole 8 formed in the partition plate 4 fixed to the drive disc 3 and the oil is supplied to the torque transmission chamber 6, while when the actuator 10-4 is turned ON, the armature 9-4b is sucked to the actuator 10-4 side and hence, the leaf spring 9-4a is brought into pressure contact with the partition plate 4 whereby the oil supply adjustment hole 8 is closed and the supply of the oil to the torque transmission chamber 6 is stopped.

In case of the external-control-type fan coupling device shown in FIG. 4, by adopting the linear solenoid-type actuator 10-4 having no operating shaft, it is possible to enhance the fan rotation response. Further, compared to the external-control-type fan coupling device having the structure in which the partition plate 4 having the oil supply adjustment hole 3 is mounted on the cover 2-2 of the hermetic housing 2, the external-control-type fan coupling device shown in FIG. 4 can make use of a centrifugal force of the rotary shaft body (drive shaft) 1 for supplying the oil to the torque transmission chamber 6 and hence, it is possible to further enhance the fan rotation response.

Figure 5:
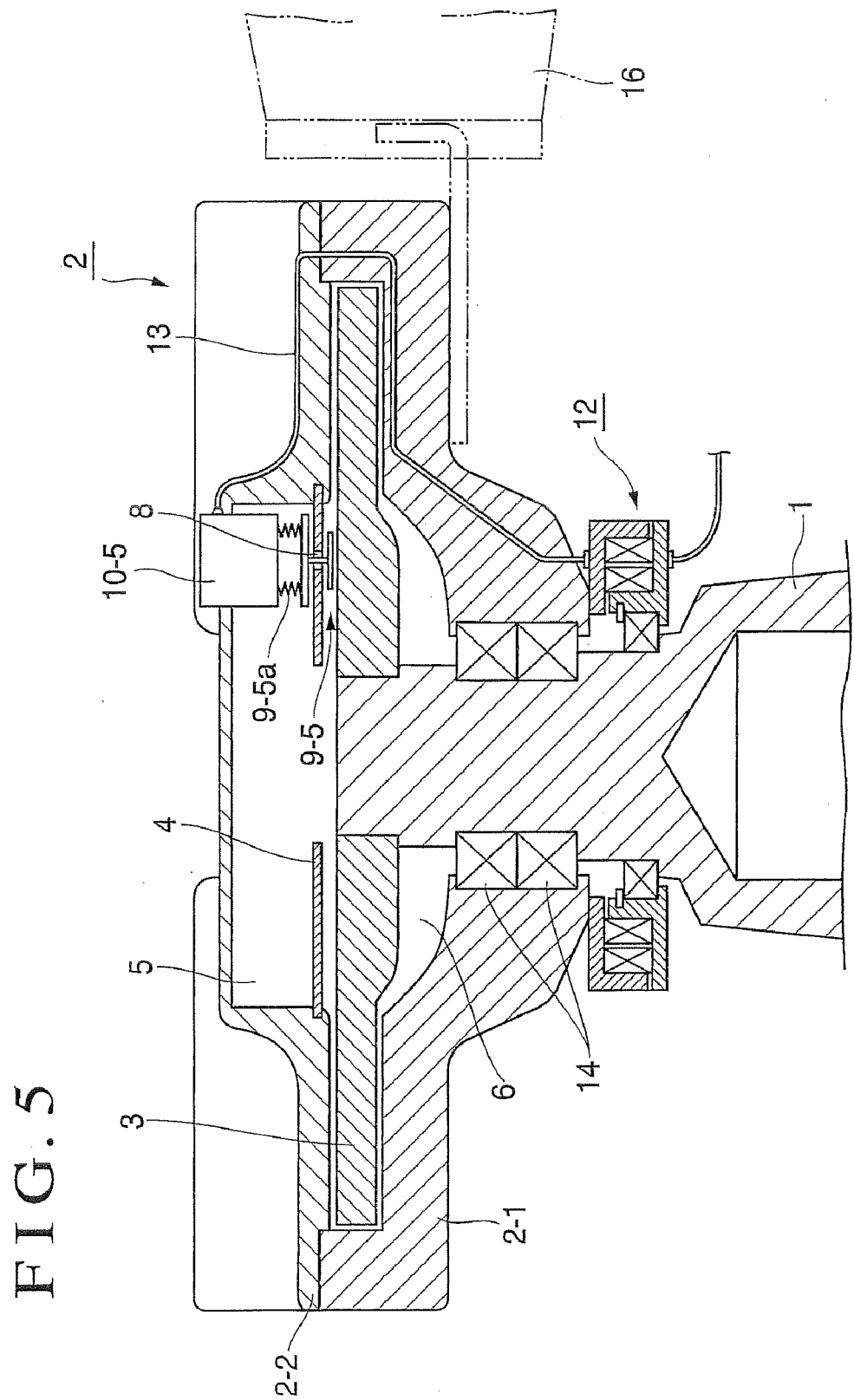
FIG. 5 is a longitudinal cross-sectional view showing the fifth embodiment of an external-control-type fan coupling device according to the present invention.

The external-control-type fan coupling device shown in FIG. 5 relates to a case in which the present invention is applied to an external-control-type fan coupling device in which the partition plate 4 having the oil supply adjustment hole 8 is fixedly mounted on the cover 2-2 of the hermetic housing 2 and the fan coupling device adopts a system which supplies electricity to the linear-solenoid-type actuator 10-5 which is equal to the system shown in FIG. 1. That is, the fan coupling device shown in FIG. 5 adopts the system in which the linear solenoid type actuator is miniaturized and, at the same time, the miniaturized actuator is neither aligned nor coaxial with the rotary shaft body (drive shaft) 1 but is offset from the rotary shaft body (drive shaft) 1 so as to open or close the oil supply adjustment hole 8. To explain the constitution of the fan coupling device, the linear solenoid-type miniaturized actuator 10-5 is mounted on an end portion of the cover 2-2 of the hermetic housing 2, and the oil-supply valve member 9-5 which opens or closes the oil supply adjustment hole B of the partition plate 4 which is fixed to the cover 2-2 of the hermetic housing 2 is resiliently supported on the miniaturized actuator 10-5 by way of a spring 9-5a.

In case of the external-control-type fan coupling device which adopts the linear solenoid-type miniaturized actuator 10-5, when the actuator 10-5 is turned OFF, the oil-supply valve element 5-5 is spaced apart from the actuator 10-5 due to an action of the spring 9-5a thus opening the oil-supply adjustment hole 3 formed in the partition plate 4 fixed to the cover 2-2 and the oil is supplied to the torque transmission chamber 6, while when the actuator 10-5 is turned ON, the oil-supply valve member 9-5 is sucked to the actuator 10-5 side and hence, the valve member 9-5 is brought into pressure contact with the partition plate 4 whereby the oil supply adjustment hole 8 is closed and the supply of the oil to the torque transmission chamber 6 is stopped.

In case of the external-control-type fan coupling device shown in FIG. 5, by adopting the linear solenoid-type miniaturized actuator 10-5 having no operating shaft and by adopting the system which opens or closes the oil supply adjustment hole 8 by offsetting the rotary shaft body (drive shaft) 1, it is possible to enhance the fan rotation response and, at the same time, it is possible to achieve the miniaturization, the reduction of weight of the fan coupling device and the reduction of the manufacturing cost of the fan coupling device.

Figure 6:
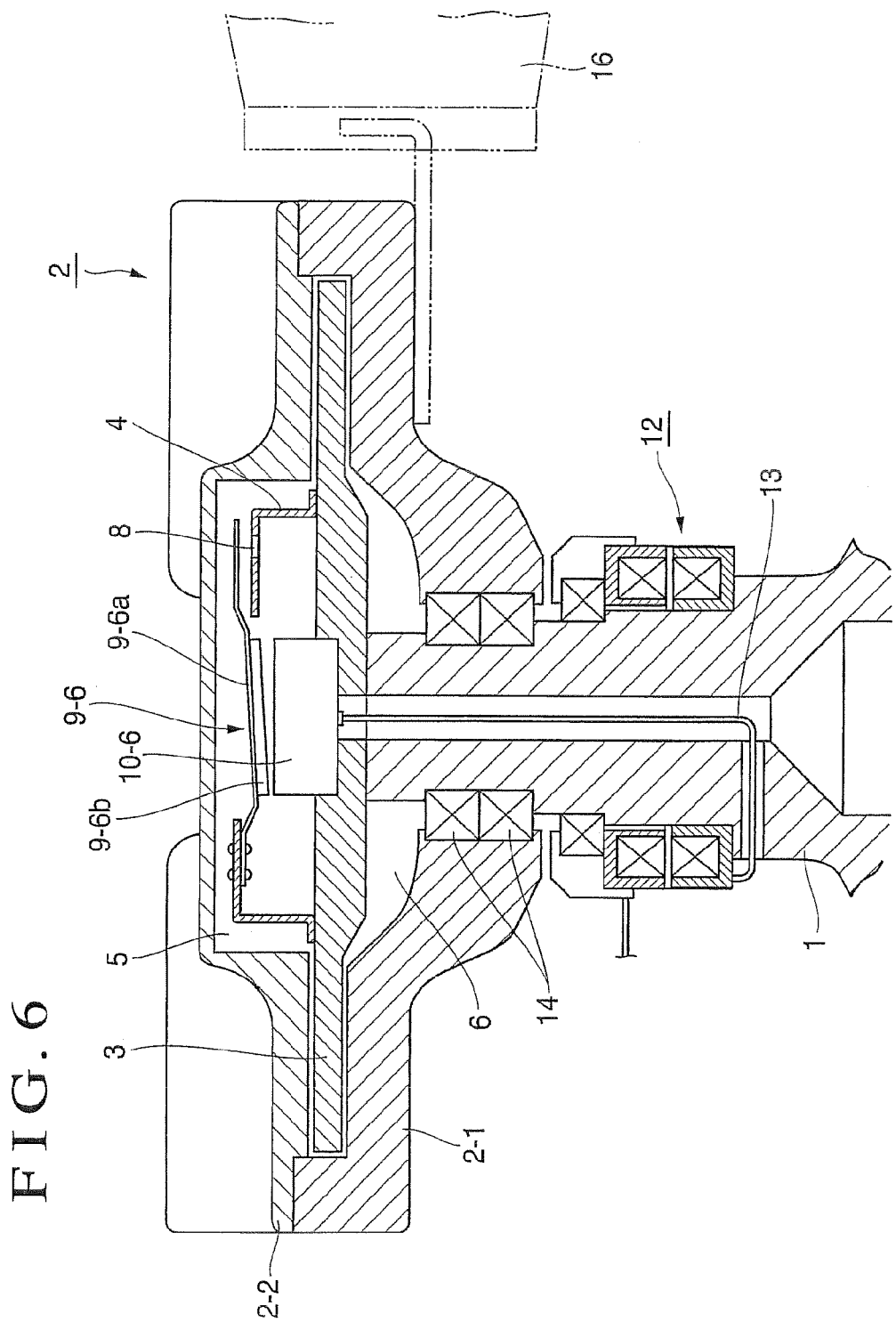
FIG. 6 is a longitudinal cross-sectional view showing the sixth embodiment of an external-control-type fan coupling device according to the present invention.

The external-control-type fan coupling device shown in FIG. 6 relates-to a case in which the present invention is applied to an external-control-type fan coupling device in which the partition plate 4 having the oil supply adjustment hole 8 is fixedly mounted on the drive disc 3 and the fan coupling device adopts a system in which the linear solenoid-type actuator 10-6 is mounted on the drive disc 3, the oil-supply valve element 9-5 which is formed of a leaf spring 9-6a and an armature 9-6b is used, and the drive electricity for the linear solenoid-type actuator 10-6 is supplied from the power source supply transformer 12 shown in FIG. 2 through the lead line 13.

In case of the external-control-type fan coupling device which adopts the linear solenoid-type actuator 10-6, the armature 9-6b of the oil-supply valve element 9-6 is formed of the leaf spring 9-6a and the armature 9-6b, the proximal end portion of the leaf spring 9-6a is mounted on the partition plate 4 in a state that the armature 9-6b of the oil-supply valve element 9-6 is arranged in the vicinity of the drive part of the actuator 10-6, Further, the fan coupling device adopts a system in which the drive electric power for the actuator 10-6 is supplied to the actuator 10-6 from the power source supply transformer 12 fixed to the rotary shaft body (drive shaft) 1 through the lead line 13 which is wired in the inside of the rotary shaft body (drive shaft) 1.

In the external-control-type fan coupling device having such a constitution, when the linear solenoid-type actuator 10-6 is turned OFF, the armature 9-6b of the oil-supply valve element 9-6 is spaced apart from the actuator 10-6 due to an action of the leaf spring 9-6a thus opening the oil-supply adjustment hole 8 formed in the partition plate 4, and the oil is supplied to the torque transmission chamber 6, while when the actuator 10-6 is turned ON, the armature 9-6b is sucked to the actuator 10-6 side end hence, the leaf spring 9-6a is brought into pressure contact with the partition plate 4 whereby the oil supply adjustment hole 8 is closed and the supply of the oil to the torque transmission chamber is stopped.

In case of the external-control-type fan coupling device shown in FIG. 6, by adopting the linear solenoid-type actuator 10-6 having no operating shaft, in the same manner as the fan coupling device shown in FIG. 2 and FIG. 4, it is possible to enhance the fan rotation response. Further, since the lead line 13 for supplying electricity can be wired in the inside of the rotary shaft body (drive shaft) 1, compared to the system in which the lead line 13 is wired through the casing 2-1 and the cover 2-2 of the hermetic housing 2, it is possible to obtain advantageous effects including an advantageous effect that a centrifugal force which acts on the lead line 13 is small and hence, there is no possibility of the occurrence of disconnection whereby the elevation of the electric resistance attributed to the generation of heat by the fan coupling device can be reduced.

As the layout (arrangement) of the primary coil 12-1 and the secondary coil 12-2 of the power source supply transformer 12 according to the device of the present invention, six types A, B, C, D, E, F are considered as illustrated in FIG. 7. To explain the technical features of the respective types, the transformer 12 of the type A has the simple structure and hence, it is possible to achieve the miniaturization and the reduction of weight of the transformer 12 and the reduction of manufacturing cost, the transformer 12 of the type B can achieve the miniaturization and the reduction of weight and, at the same time, exhibits the favorable magnetism transmission efficiency from the primary coil 12-1 to the secondary coil 12-2, the transformer 12 of the type C has the simple structure and hence, it is possible to reduce the manufacturing cost and, at the same time, can easily perform the coil fixing method, the transformer 12 of the type D provides the easy coil fixing method and exhibits the favorable magnetism transmission efficiency from the primary coil 12-1 to the secondary coil 12-2, and the transformer 12 of the types E and F can realize the miniaturization and the reduction of the weight and, at the same time, and can exhibit the favorable magnetism transmission efficiency from the primary coil 12-1 to the secondary coil 12-2.

In the fan coupling device having the above-mentioned constitutions shown in FIG. 1 to FIG. 6, the rotation of the fan 16 is controlled by following methods (1), (2).

(1) When the ECU determines that the increase of the rotational speed of the fan 16 is necessary in response to the information such as a radiator water temperature, an intake air temperature, an engine rotational speed, a step-in depth of an acceleration pedal, a vehicle speed or the like, an AC voltage (sinusoidal wave or square wave) is applied to the primary coil 12-1 of the power source supply transformer 12 and hence, the actuator 10 is operated so as to open the oil supply valve member 3 to elevate the rotational speed of the fan 16. When it is necessary to lower the rotational speed of the fan 16, the power source is turned OFF. Here, due to the setting of the actuator 10, it is possible to adopt either one of an OFF/ON mode with no supply of electricity and an ON/OFF mode with supply of electricity, (2) When the rotational speed of the fan is to be controlled to an arbitrary rotational speed instructed by an ECU, a feedback control is performed on the fan rotational speed. Further, by changing the primary coil 12-1 side power source frequency, an inductive electromotive force amount induced by the secondary coil 12-2 is changed so as to control an operational amount of the actuator 10 whereby the rotational speed of the fan is controlled to an arbitrary rotational speed instructed by the ECU.

Here, when the rotary solenoid type actuator is used, by providing the oil supply adjustment holes 8 formed in the partition plate 4 in plural numbers by changing both of the radial directional positions and the circumferential directional positions, it is possible to sequentially form the oil supply adjustment holes 8 starting from the oil supply adjustment holes 8 at the position where the radius is smallest and hence, it is possible to perform the multiple-stage control of the fan rotational speed. Further, by gradually and continuously forming the oil supply adjustment holes 8, it is possible to perform a linear control of the fan rotational speed. Still further, by forming the oil supply adjustment holes 8 in multiple stages in a state that the diameter of the oil supply adjustment holes 8 is made continuously and gradually smaller, it is possible to perform a finer multiple-stage control of the fan rotational speed.

INDUSTRIAL APPLICABILITY

The external-control-type fan coupling device of the present invention adopts the system in which the power generating part which supplies the electricity by making use of the rotation of the drive shaft (rotary shaft body) is incorporated into the fan coupling device so as to drive the actuator which operates the valve element. Accordingly, even when the external-control-type fan coupling device is a large-diameter external-control-type fan coupling device to drive a large-diameter fan for a large-sized vehicle, it is unnecessary to increase a diameter of coils and hence, it is possible to achieve the simplification, the miniaturization and the reduction of weight of the whole device structure whereby the layout property is enhanced. Further, the power consumption can be reduced. Still further, the present invention is also applicable to the existing external-control-type fan coupling device.

What is claimed is:

1. An external-control-type fan coupling device being configured such that an inside of a hermetic housing which is formed of a non-magnetic casing which is supported on a rotary shaft body which mounts a drive disc on a distal end thereof by way of a bearing and a cover which is mounted on the casing is divided into an oil reservoir chamber and a torque transmission chamber which houses the drive disc therein by a partition plate which is mounted on the drive disc, the coupling device includes an oil circulation flow passage which is formed between the torque transmission chamber and the oil reservoir chamber and an oil supply adjustment hole which is formed in the partition plate, the coupling device includes a valve element which opens or closes the oil supply adjustment hole in the oil reservoir chamber, and an open/close control of the oil circulation flow passage is performed by operating the valve element using an actuator, and the rotational torque transmission from a drive side to a driven side is controlled by increasing or decreasing an effective contact area of oil in a torque transmission gap portion defined between the drive side and the driven side, wherein the coupling device adopts a method in which the actuator is arranged in the inside of the rotary shaft body, a control rod which is operated by the actuator penetrates the inside of the rotary shaft body in the axial direction so as to control the valve element, the coupling device includes a primary coil which is fixed to the outside and a secondary coil which is fixed to the rotary shaft body and faces the primary coil in an opposed manner, and the actuator which is mounted in the rotary shaft body is driven by an electric current induced to the secondary coil.

2. The external-control-type fan coupling device according to claim 1, wherein the coupling device adopts a method which rectifies an AC current induced to the secondary coil into a DC current by a rectifier and the actuator is driven using the DC current.

3. The external-control-type fan coupling device according to claim 2, wherein either one of a rotary-type solenoid type actuator or a linear-type solenoid type actuator is used as the actuator.

4. The external-control-type fan coupling device according to claim 1, wherein either one of a rotary-type solenoid type actuator or a linear-type solenoid type actuator is used as the actuator.

* * * * *